No. 810,822. PATENTED JAN. 23, 1906.
G. W. TINKESS.
LURE FOR USE WITH TROLLER HOOKS.
APPLICATION FILED APR. 27, 1905.
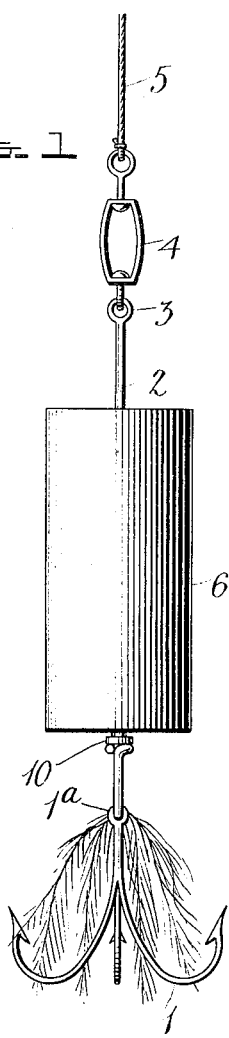
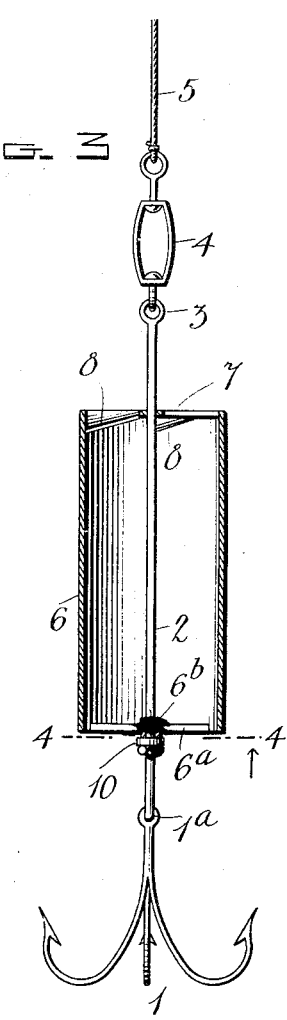
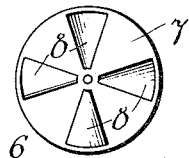
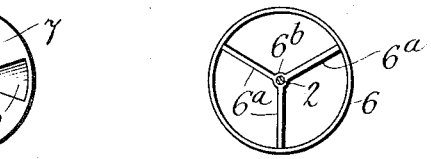
Inventor
G. W. Tinkess
by H. R. Willson
Attorney
Witnesses

UNITED STATES PATENT OFFICE.

GEORGE W. TINKESS, OF HUBBARD, MINNESOTA.

LURE FOR USE WITH TROLLER-HOOKS.

No. 810,822.  Specification of Letters Patent.  Patented Jan. 23, 1906.

Application filed April 27, 1905. Serial No. 257,790.

*To all whom it may concern:*

Be it known that I, GEORGE W. TINKESS, a citizen of the United States, residing at Hubbard, in the county of Hubbard and State of Minnesota, have invented certain new and useful Improvements in Lures for Use with Troller-Hooks; and I do declare the following to be a full, clear, and exact description of the invention, such as will enable others skilled in the art to which it appertains to make and use the same.

This invention relates to improvements in troller-hooks.

The object of the invention is to provide a hook of this character having an attracting device which will revolve on the hook when the same is drawn rapidly or slowly through the water, thereby attracting the attention of the fish.

With the above and other objects in view the invention consists of certain novel features of construction, combination, and arrangement of parts, as will be hereinafter described and claimed.

In the accompanying drawings, Figure 1 is a side view of a troller-hook constructed in accordance with the invention. Fig. 2 is an end view of the revolving member of the hook. Fig. 3 is a central vertical longitudinal sectional view of the device, and Fig. 4 is a detail sectional view taken on the line 4 4 in Fig. 3.

Referring more particularly to the drawings, 1 denotes the hook, which may be in the form of a triple hook, as shown, and in any other form, and which is loosely connected or jointed, as shown at 1$^a$, to one end of the stem 2. This stem 2 is elongated and provided on its upper end with an eye 3, to which is attached a swivel 4, by means of which the hook is connected to a line 5.

Revolubly mounted on the stem 2 is a tubular attracting device 6, which is preferably, though not necessarily, cylindrical. The outer end of the cylinder is provided with spokes 6$^a$ and a hub 6$^b$, through which the stem 2 passes and which is adapted to rest upon a washer 10, provided upon said stem. The inner end of the cylinder is closed by a disk 7, in which is cut radial and segmental slits, the metal between said slits being bent to form blades 8, the angle of which when the hook is drawn through the water will revolve the cylinder on the stem of the hook. This arrangement will cause the cylinder to revolve whether the hook is drawn rapidly or slowly through the water.

The cylinder may be nickel or striped in bright colors, so that when revolved it will quickly attract the attention of the fish, which will be lured to the hook and caught. If desired, the hook may be hidden by means of a hackle, fly, or other artificial bait.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what 1 claim as new, and desire to secure by Letters Patent, is—

An artificial bait or lure comprising an elongated shank or stem, a revolubly-mounted cylinder arranged on said stem, and blades formed in one end of said cylinder whereby the latter will be turned on said stem, substantially as described.

In testimony whereof I have hereunto set my hand in presence of two subscribing witnesses.

GEORGE W. TINKESS.

Witnesses:
 H. W. BATTIN,
 G. E. NORMAN.